(12) United States Patent
Tripathi et al.

(10) Patent No.: US 7,110,393 B1
(45) Date of Patent: Sep. 19, 2006

(54) SYSTEM AND METHOD FOR PROVIDING USER MOBILITY HANDLING IN A NETWORK TELEPHONY SYSTEM

(75) Inventors: Anoop Tripathi, Mount Prospect, IL (US); Sudhakar Ramakrishna, Lake Zurich, IL (US)

(73) Assignee: 3Com Corporation, Marlborough, MA (US)

( * ) Notice: Subject to any disclaimer, the term of this patent is extended or adjusted under 35 U.S.C. 154(b) by 900 days.

(21) Appl. No.: 09/795,587

(22) Filed: Feb. 28, 2001

(51) Int. Cl.
H04L 12/28 (2006.01)

(52) U.S. Cl. ...................... 370/352; 370/401

(58) Field of Classification Search ............... 370/352, 370/401
See application file for complete search history.

(56) References Cited

U.S. PATENT DOCUMENTS

| | | | |
|---|---|---|---|
| 6,421,339 B1 * | 7/2002 | Thomas | 370/352 |
| 6,434,143 B1 * | 8/2002 | Donovan | 370/352 |
| 6,512,818 B1 * | 1/2003 | Donovan et al. | 370/352 |
| 6,584,093 B1 * | 6/2003 | Salama et al. | 370/351 |
| 6,615,236 B1 * | 9/2003 | Donovan et al. | 709/203 |
| 6,625,141 B1 * | 9/2003 | Glitho et al. | 370/352 |
| 6,636,596 B1 * | 10/2003 | Gallant et al. | 370/389 |
| 6,725,036 B1 * | 4/2004 | Faccin et al. | 455/433 |
| 6,751,652 B1 * | 6/2004 | Thomas | 709/225 |
| 6,775,277 B1 * | 8/2004 | Li et al. | 370/401 |
| 6,795,857 B1 * | 9/2004 | Leung et al. | 709/224 |
| 6,816,912 B1 * | 11/2004 | Borella et al. | 709/238 |
| 6,829,480 B1 * | 12/2004 | Hoglund et al. | 455/433 |
| 6,839,323 B1 * | 1/2005 | Foti | 370/392 |
| 6,865,681 B1 * | 3/2005 | Nuutinen | 713/201 |
| 6,876,633 B1 * | 4/2005 | Strathmeyer et al. | 370/401 |
| 6,937,597 B1 * | 8/2005 | Rosenberg et al. | 370/356 |

OTHER PUBLICATIONS

Schulzrinne, "SIP Registration," Internet Engineering Task Force, Internet Draft, ietf-schulzrinne-sip-register-00.txt (printed Jan. 25, 2001), Oct. 5, 2000.
Vakil, F.; Dutta, A.; Chen, J-C.; Tauil, M.; Baba, S.; Nakajima, N.; Shobatake, Y.; and Schulzrinne, H.; "Supporting Mobility for TCP with SIP, Internet Engineering Task Force," Internet Draft, draft-itsumo-sip-mobility-tcp-00.txt, (printed Jan. 25, 2001), Dec. 2000.
Vakil, F.; Dutta, A.; Tauil, M.; Baba, S.; Nakajima, N.; Shobatake, Y.; and Schulzrinne, H.; "Supporting Service Mobility with SIP," Internet Engineering Task Force, Internet Draft, Dec. 2000.

(Continued)

Primary Examiner—Andrew C. Lee
(74) Attorney, Agent, or Firm—McDonnell Boehnen Hulbert & Berghoff LLP

(57) ABSTRACT

A system and method for providing user mobility handling in a network telephony system is provided. In one embodiment, the method includes receiving a register request from a network entity on a first domain and modifying a user identifier in the register request. A registration database is preferably updated with the modified user identifier. The modified register request is transmitted via a network to a network entity on a second domain. An authentication process preferably takes place between the network entity on the first domain and the network entity on the second domain. If successful, a confirmation is received via the network from the network entity on the second domain. Various embodiments of the invention may, for example, allow a user typically located in a home domain to temporarily move to a visiting domain, while maintaining the user's home domain user identifier. Preferred embodiments utilize the Session Initiation Protocol.

18 Claims, 6 Drawing Sheets

OTHER PUBLICATIONS

Vakil, F.; Dutta, A.; Chen, J-C.; Tauil, M.; Baba, S.; Nakajima, N.; Shobatake, Y.; and Schulzrinne, H.; "Supporting Mobility for Multimedia with SIP," Internet Engineering Task Force, Internet Draft, draft-itsumo-sip-mobility-multimedia-00.txt (printed Jan. 25, 2001), Dec. 2000.

Vakil, F.; Dutta, A.; Chen, J-C..; Baba, S.; Nakajima, N.; Shobatake, Y.; and Schulzrinne, H.; "Supporting Mobility Management in a SIP Environment; Requirements, Functions and Issues," Internet Engineering Task Force, Internet Draft, draft-itsumo-sip-mbility-req-02.txt (printed Jan. 25, 2001), Dec. 2000.

Schulzrinne, H., "Personal Mobility for Multimedia Services in the Internet," IDMS '96 (European Workshop on Interactive Distributed Multimedia Systems and Services), Berlin, Germany, Mar. 4-6, 1996.

Wedlund, E.; Schulzrinne, H., "Mobility Support using SIP.", Circa 1999.

B. Douskalis, "IP Telephony: The Integration of Robust VoIP Services," Prentice Hall PTR, Chapter 1, Section 1.4, pp. 69-90, 2000.

* cited by examiner

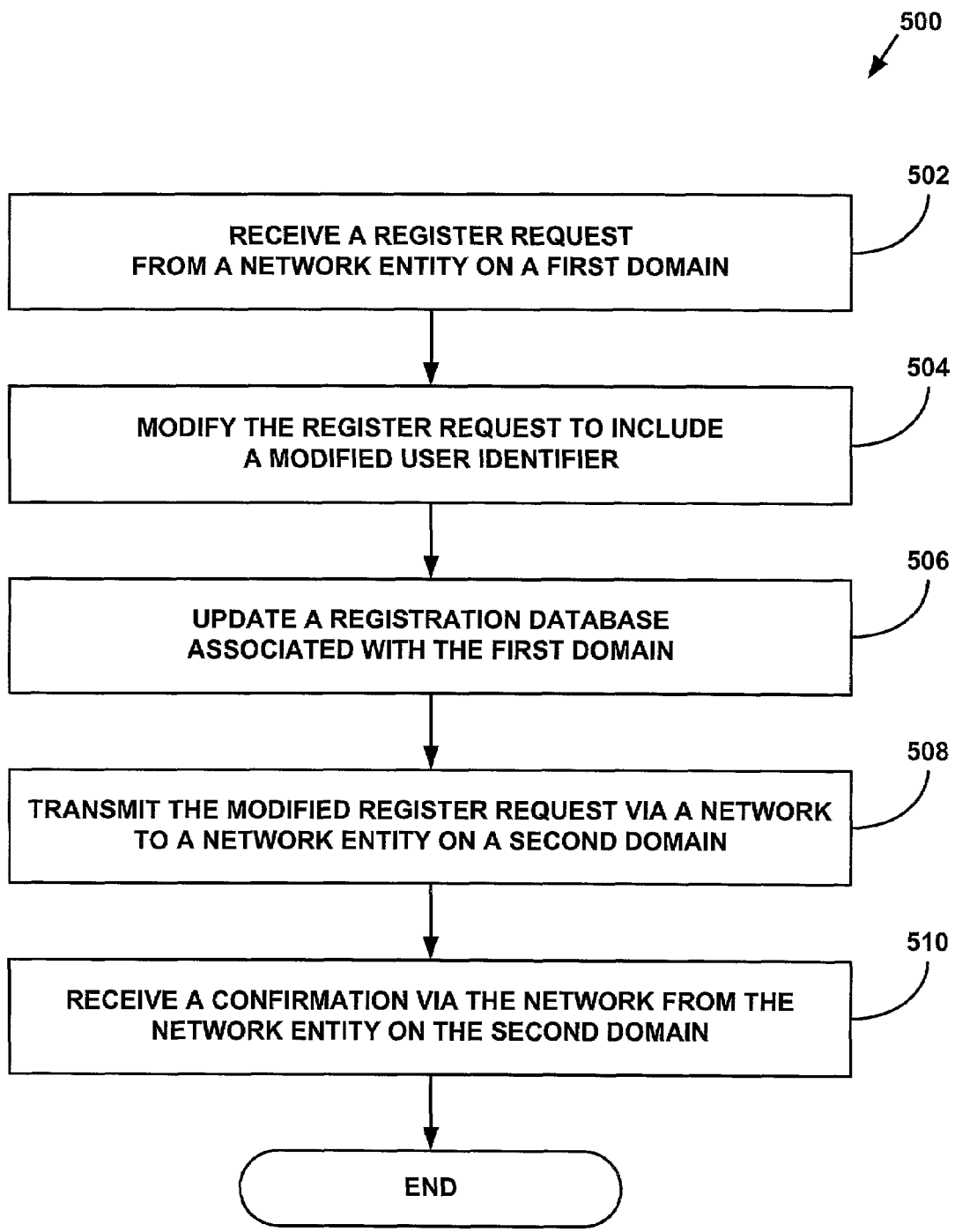

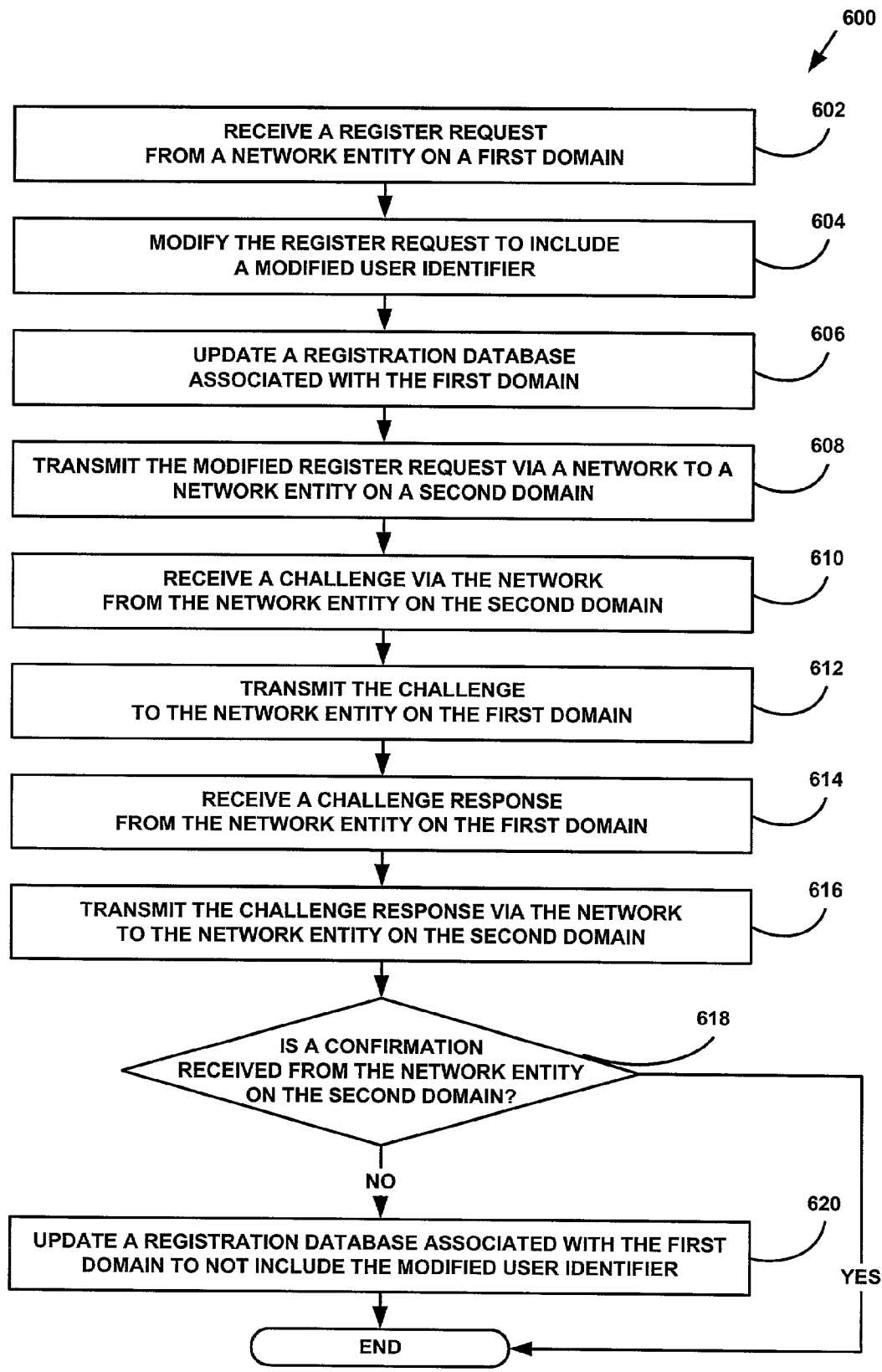

SYSTEM AND METHOD FOR PROVIDING USER MOBILITY HANDLING IN A NETWORK TELEPHONY SYSTEM

FIELD OF THE INVENTION

The present invention relates to network telephony systems. More particularly, the present invention relates to providing user mobility handling in a network telephony system.

BACKGROUND OF THE INVENTION

As the quality of network telephony systems has improved, there has been a migration of users from the traditional PSTN (Public Switched Telephone Network) to network telephony systems. With the proliferation of the Internet, Internet telephony has enabled distantly located users to communicate with one another using data protocols underlying the Internet. For example, the IP (Internet Protocol) suite along with various signaling protocols has made IP telephony a popular form of network telephony.

The Session Initiation Protocol (SIP) is a signaling protocol that may be used to assist with call set-up, management, and teardown. Other signaling protocols, such as the ITU-T H.323, MEGACO, and MGCP protocols, may also be used to implement various signaling functions. While these network telephony systems have provided advantages in cost and flexibility, certain challenges have arisen. In particular, network telephony systems are expected to enable users to easily move from one IP network to another.

One aspect of user mobility is to keep a call (or other session) connected while a user is moving from one domain to another. This first aspect is being addressed by efforts underlying the Mobile I.P. protocol, which is described in Perkins, C., "IP Mobility," Internet Engineering Task Force (IETF) Request-For-Comments (RFC) 2002, October 1995, incorporated by reference herein.

Another aspect of user mobility is enabling a user to make and/or receive calls (or more generally to initiate and/or participate in a session) when the user moves from one domain to another without changing the user's identity. RFC 2002 does not adequately address this second aspect, nor does SIP or other signaling protocols.

Thus, a need exists for user mobility handling in a network telephony system.

SUMMARY OF THE INVENTION

In accordance with an illustrative embodiment of the present invention, some of the problems associated with in a network telephony system are addressed.

In a first embodiment, a method for providing user mobility handling in a network telephony system is provided. The method includes receiving a register request from a network entity on a first domain and modifying a user identifier in the register request. A registration database is updated with the modified user identifier. The modified register request is transmitted via a network to a network entity on a second domain. A confirmation is received via the network from the network entity on the second domain.

In another embodiment, a register request is received from a network entity on a first domain. The register request includes a user identifier. The register request is modified to form a modified register request, having a modified user identifier. The modified register request is transmitted via a network to a network telephony server on a second domain. A register response is received via the network from the network telephony server on the second domain. The register response includes a challenge, such as an authentication query. The register response to the network entity on the first domain, and a challenge response is received from the network entity on the first domain. The challenge response is transmitted via the network to the network telephony server on the second domain. A determination is then made as to whether a confirmation is received from the network telephony server on the second domain, indicating that the challenge response was successful. The embodiment may additionally include updating a registration database associated with the second domain, to include the modified user identifier. In addition, the modified user identifier may be deleted upon a determination that the confirmation was not received.

In yet another embodiment, a method for providing user mobility handling at a first network telephony server is provided, in which the first network telephony server is operable to implement at least a portion of the Session Initiation Protocol. The method includes receiving a register request from a network entity on a first domain. The register request includes a user identifier in a To field and an address associated with the network entity in a Contact field. The user identifier is associated with a second domain. The register request is modified so that the Contact field includes a modified user identifier associated with the first domain. A registration database is updated to include the modified user identifier, and the modified register request is transmitted via a network to a second network telephony server on the second domain. An unauthorized response, including a challenge, is received via the network from the second network telephony server. The first network telephony server transmits the unauthorized response to the network entity; and receives a register response from the network entity. The register response includes the user identifier in a To field and the address associated with the network entity in a Contact field, and additionally includes a challenge response. The first proxy server modifies the register response so that the Contact field includes the modified user identifier, and transmits the modified register response via the network to the second network telephony server. The first network telephony server then determining whether a confirmation is received from the second network telephony server, and deletes the modified user identifier from the registration database in response to determining that the confirmation is not received.

BRIEF DESCRIPTION OF THE DRAWINGS

Preferred embodiments of the present invention are described with reference to the following drawings, wherein:

FIG. 5 is a flow diagram illustrating a method for providing user mobility handling in a network telephony system; and FIG. 6 is a flow diagram illustrating a method for providing user mobility handling according to another embodiment of the present invention.

DETAILED DESCRIPTION

A. Network Telephony System

Figure 1:
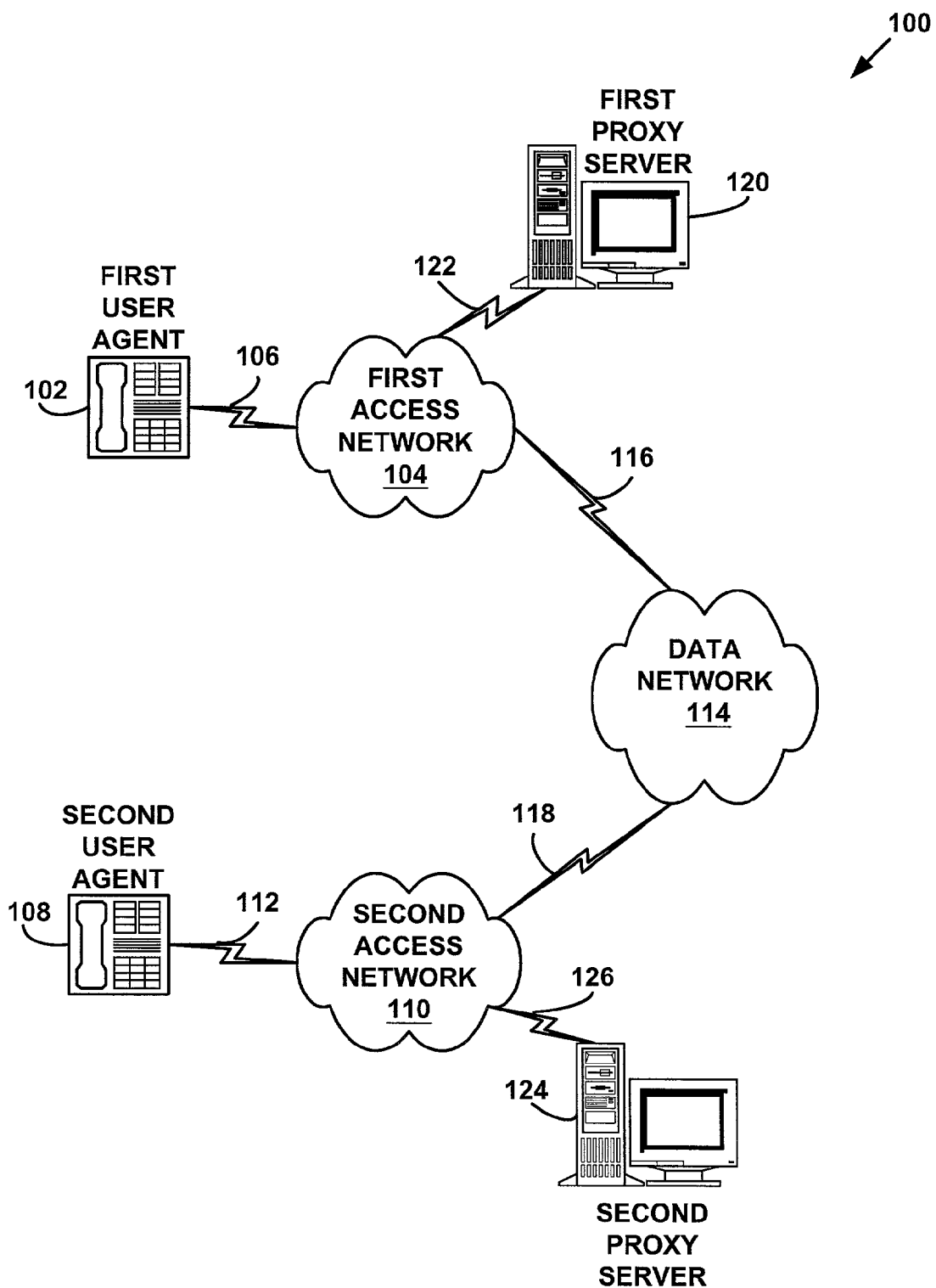
FIG. 1 is a simplified block diagram illustrating a network telephony system according to an exemplary embodiment of the present invention.

FIG. 1 is a simplified block diagram illustrating a network telephony system 100 according to an exemplary embodiment of the present invention. The system 100 includes a first user agent 102 communicatively linked to a first access network 104 by link 106. A second user agent 108 is linked to a second access network 110 by link 112. Network entities on the first access network 104 may communicate with network entities on the second access network 110 through a data network 114, such as the public Internet, linking the first access network 104 to the second access network 110 by links 116 and 118, respectively. A first proxy server 120 linked to the first access network 104 by link 122 and a second proxy server 124 linked to the second access network 110 by link 126 may be used to perform routing of signaling requests and responses. The links shown in the system 100 may be hard-wired or wireless links, and they may include intermediate network entities and/or networks. For example, the links 116 and 118 may contain various configurations of gateways and/or routers.

In a preferred embodiment, the system 100 utilizes the SIP signaling protocol. SIP is described in Handley, et al., "SIP: Session Initiation Protocol," IETF (RFC) 2543, March 1999, which is incorporated by reference herein. Other signaling protocols, such as H-323, MGCP, MEGACO, and other standard or proprietary techniques may alternatively be used.

In a SIP implementation, the first user agent 102 and the second user agent 108 each contain a SIP client and a SIP server. The first proxy server 120 and the second proxy server 124 also each contain a SIP client and a SIP server. Additional user agents may be included in the network 100, as may additional proxy servers. In addition, system 100 may also include other servers, such as registration servers, redirect servers, and/or location servers. In addition, one or more of these server types may be combined into one physical device. Moreover, although the user agents 102 and 108 are shown to be network phones, this is for exemplary purposes only, and other implementations may also be used. A typical implementation for SIP-based IP telephony would be either a system of SIP-based network phones such as the 3Com® SIP phone, offered by 3Com Corporation, the assignee of the present invention. Another typical implementation is a personal computer with software to perform SIP user agent functions, and user interface hardware, such as a microphone and headphone to serve as a means for communicating voice information. Other user interfaces, such as video and/or other types of communication data, may also be used and are intended to be within the scope of the present invention.

The first and second user agents 102 and 108 may also receive calls from other user agents. In addition, they may receive calls from devices on other types of communication networks, such as from telephones located on the POTS (Plain Old Telephone System) when appropriate gateways are implemented.

The system 100 may be used to implement IP telephony, as well as other telephony-related functions. Further details on how such a system operates may be found by referring to the following patent applications, assigned to the assignee of the present invention, and incorporated by reference herein:

"System and Method for Providing Fault Tolerance in a Network Telephony System," to Tripathi, Ser. No. 09/685,286;

Distributed Network Address Translation for a Network Telephony System," to Schuster, et al., Ser. No. 09/707,708, now U.S. Pat. No. 6,822,957, issued on Nov. 23, 2004;

"System and Method for Providing Access to a Content Server," to Schuster, et al., Ser. No. 09/677,077;

"System and Method for Performing Messaging Services Using a Data Communications Channel in a Data Network Telephone System," to Schuster, et al., Ser. No. 09/726,993, now U.S. Pat. No. 6,870,830, issued on Mar. 22, 2005;

"System and Method for Providing Service Provider Configurations for Telephones Using a Central Server in a Data Network Telephony System," to Schuster, et al., Ser. No. 09/406,066;

"System and Method for Providing Telephone Service Having Private Branch Exchange Features in a Data Network Telephony System" to Schuster et al., Ser. No. 09/515,365, now U.S. Pat. No. 6,804,224, issued on Oct. 12, 2004;

"System and Method for Providing A Wireless Data Network Telephone System" to Schuster et al., Ser. No. 09/515,798;

"System and Method for Accessing A Network Server Using A Portable Information Devices Through A Network Based Telecommunication System" to Schuster et al., Ser. No. 09/515,969;

"System and Method for Accessing Radio Programs Using a Data Network Telephone in A Network Based Telecommunication System" to Schuster et al., Ser. No. 09/516,269, now U.S. Pat. No. 6,914,897, issued on Jul. 5, 2005;

"System and Method for Providing Local Information in a Data Network Telephony System" to Schuster et al., Ser. No. 515,366, now U.S. Pat. No. 6,650,901, issued on Nov. 18, 2003;

"System and Method for Enabling A Portable Information Device for Use in a Data Network Telephone System" to Schuster et al, Ser. No. 09/515,795;

"Dialing Token for Initiating A Telephone Connection in a Data Network Telephone System" to Schuster et al, Ser. No. 09/515,364;

"Personalized Call Announcement on a Data Network Telephony System" to Schuster, et al., Ser. No. 09/515,387;

"Personalizing a Data Network Appliance on a Data Network Telephony System" to Schuster, et al., Ser. No. 09/515,970;

"Proximity-Based Registration on a Data Network Telephony System" to Schuster, et al., Ser. No. 09/515,796, now U.S. Pat. No. 6,857,021 issued on Feb. 15, 2005;

"System and Method for Providing User Mobility Services on a Telephony Network" to Schuster, et al., Ser. No. 09/451,388, now U.S. Pat. No. 6,446,127, issued on Sep. 3, 2002;

"System and Method for Providing Call-Handling Services on a Telephony Network" to Schuster, et al., Ser. No. 09/470,879, now U.S. Pat. No. 6,584,490, issued on Jun. 24, 2003;

"Method, Apparatus and Communications System for Companion Information and Network Appliances" to Wang, et al., Ser. No. 09/181,431, now U.S. Pat. No. 6,161,134, issued on Dec. 12, 2000;

"System and Method for Controlling Telephone Service Using a Wireless Personal Information Device" to Schuster, et al., Ser. No. 09/406,321;

"System and Method for Advertising Using Data Network Telephone Connections" to Schuster, et al., Ser. No. 09/406,320, now U.S. Pat. No. 6,937,699, issued on Aug. 30, 2005;

"System and Method for Providing User-Configured Telephone Service in a Data Network Telephony System" to Sidhu, et al., Ser. No. 09/405,283, now U.S. Pat. No. 6,744,759, issued on Jun. 1, 2004;

"System and Method for Accessing a Network Server Using a Portable Information Device Through a Network Based Telecommunication System" to Schuster, et al., Ser. No. 09/406,322;

"System and Method for Interconnecting Portable Information Devices Through a Network Based Telecommunication System" to Schuster, et al., Serial No. 09/406,152, now U.S. Pat. No. 6,681,252, issued on Jan. 20, 2004;

"System and Method for Enabling Encryption on a Telephony Network" to Schuster, et al., Ser. No. 09/405,981, now U.S. Pat. No. 6,857,072, issued on Feb. 15, 2005;

"System and Method for Associating Notes with a Portable Information Device on a Network Telephony Call" to Schuster, et al., Ser. No. 09/406,151, now U.S. Pat. No. 6,795,429, issued on Sep. 21, 2004;

"System and Method for Providing Shared Workspace Services Over a Telephony Network" to Schuster, et al., Ser. No. 09/406,298;

"System and Method for Providing Service Provider Configurations for Telephones in a Data Network Telephony System" to Schuster, et al., Ser. No. 09/406,066;

System and Method for Using a Portable Information Device to Establish a Conference Call on a Telephone Network" to Schuster, et al., Serial No. 09/406,128, now U.S. Pat. No. 6,577,622, issued on Jun. 10, 2003;

"Multiple ISP Support for Data Over Cable Networks" to Ali Akgun, et al., Ser. No. 09/321,941;

"Method and System for Provisioning Network Addresses in a Data-Over-Cable System" to Ali Akgun, et al., Ser. No. 09/218,793, now U.S. Pat. No. 6,657,991, issued on Dec. 2, 2003; and "Network Access Methods, Including Direct Wireless to Internet Access" to Yingchun Xu, et al., Ser. No. 08/887,313, now U.S. Pat. No. 6,151,628, issued on Nov. 21, 2000.

B. Exemplary Network Telephony Call Sequence

Figure 2:
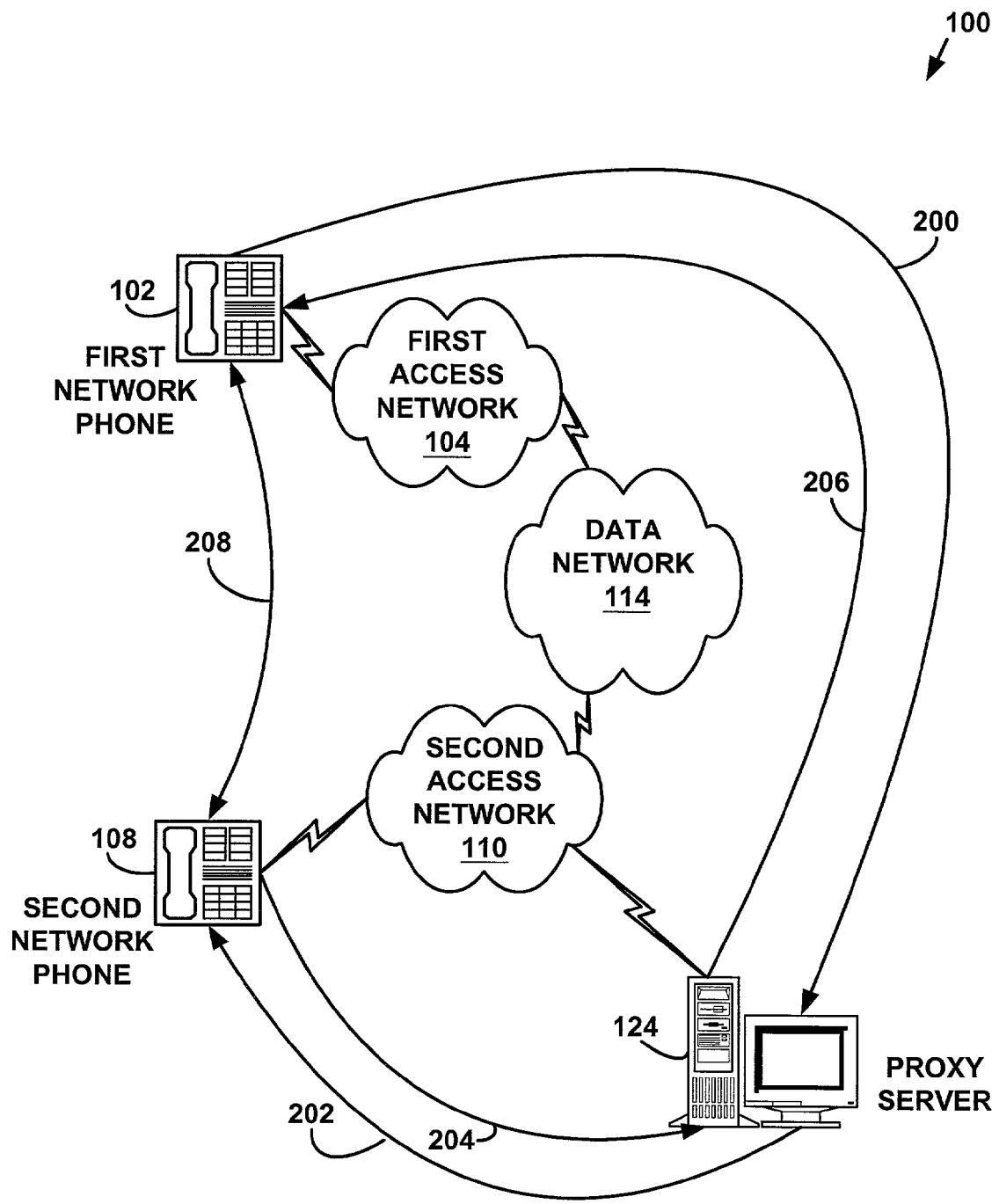
FIG. 2 is a simplified block diagram with message flow indicators illustrating the network telephony system according to an exemplary embodiment of the present invention.

FIG. 2 is a simplified block diagram with message flow indicators illustrating the network telephony system 100 according to an exemplary embodiment of the present invention. For the example shown in FIG. 2, the SIP signaling protocol will be used. Other signaling protocols may also be used. The first proxy server 120 (and its associated link 122) are omitted for purposes of this illustration.

A first user ("the caller") located at the first network phone 102 may call a second user ("the callee") located at the second network phone 108 according to the following procedure, described in IETF RFC 2543. The first network phone 102 transmits an INVITE request 200 to the proxy server 124 located on the second access network 110. The INVITE request 200 includes a FROM field to set forth the caller's SIP address and a TO field to set forth the callee's SIP address. The proxy server 124 will typically be located in the same domain as is specified in the FROM field. The proxy server 124 may use a location service locally or remotely located to the proxy server 124 to determine the location of the callee, identified in the INVITE request 200. For example, the callee may have recently moved from one location to a second location (which may be on the second access network 110 or elsewhere).

When the proxy server 124 determines that the second user is located at the second network phone 108, the proxy server 124 transmits an INVITE request 202 to the second network phone 108. The INVITE request 202 may simply be a forwarded version of the INVITE request 200, containing the SIP addresses of the caller and the callee. Upon receiving the INVITE request 202, the second network phone 108 may transmit a response message 204 to the proxy server 124. The proxy server 124 may then transmit a response message 206 back to the first network phone 102. If the transmitted response message 206 is a success response (i.e. represented by a SIP "200 OK" response), then the first network phone 102 may send an ACK message (not shown) back to the second network phone 108 to complete the call initiation process. The ACK message may be sent through the same path as the INVITE request and response messages, or it may be sent directly from the first network phone 102 to the second network phone 108, bypassing the proxy server 124. After the call has been initiated using the SIP signaling protocol, the call is connected and data (including voice information, etc.) can flow on a data channel 208 between the first network phone 102 and the second network phone 108.

SIP includes two major architectural elements: the user agent (UA) and the network server. The UA resides at the SIP end stations, (e.g. the network phones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server. Not all server types are needed to implement the various embodiments of the present invention. The communication services to be provided will determine which servers are present in the communication system. In the example illustrated in FIG. 2, only a proxy server is shown. The present invention may be implemented in systems of varying complexity, having different combinations of server types and quantities.

The example illustrated in FIG. 2 involves a SIP UAC issuing a request, a SIP proxy server acting as an end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Universal Resource Indicators (SIP-URIs), which are of the form sip: user@host.domain. Other addressing conventions may also be used.

To be reachable at the first network phone 102, the first user may initiate a registration process, such as by entering information into the first network phone 102, or by transmitting user attributes from a portable information device (such as a Personal Digital Assistant (PDA)) to the first network phone 102 to enable registration. If a wireless device is being used, a proximity registration system may be used for registration. One example of such a system is described in "Proximity-Based Registration on a Data Network Telephony System" to Schuster, et al., Ser. No. 09/515,796. The first network phone 102 formats a REGISTER request that includes the user's SIP URI (or the SIP URI of the user's portable information device) in the TO field, the first network phone's SIP URI in the FROM field, and the SIP URI of a registration server (which may be colocated with the first proxy server 120 shown in FIG. 1) in the REQUEST-URI field and sends the REGISTER request to the registration server. The registration server registers the user's SIP URI with the IP address of the first network phone 102 and returns a 200 OK response to the first network phone 102. As another alternative, a user's portable information device may be assigned a device address, such as an IP address, that is different from the device address of the first network phone 102. If a signaling protocol other than SIP is used, then the procedure may vary somewhat from the embodiment described above, which utilizes SIP.

The message sequence described above applies to the case where the SIP URI for the registration server is known. Other approaches to registration are possible, such as broadcasting to the registration multicast address "sip.mcast.net" (224.0.1.75), and are discussed in further detail in IETF RFC 2543.

Once the user's SIP URI is registered with the registration server, subsequent calls to the user's SIP URI are resolved to the address of the first network phone 102, to which the user is registered. Thus, if a call is placed to the user's SIP URI, the first network phone 102 will alert the user of an incoming call.

A typical SIP-based network telephony system may contain several types of servers. Redirect servers may be used to process an INVITE message by sending back the SIP-URI where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several phones at once until somebody takes the call. Registrar servers are used to record the SIP address (SIP URI) and the associated IP address. The most common use of a registrar server is for the UAC to notify the registrar where a particular SIP URI can be reached for a specified amount of time. When an INVITE request arrives for the SIP URI used in a REGISTER message, the proxy or redirect server handles the request accordingly.

The network phones 102 and 108 in the system 100 preferably have pre-programmed device identifiers (e.g. phone numbers), represented as SIP-URI's that are of the form sip: user@domain. An example is sip:1234567890@sample.com. After power-up, each of the network phones 102 and 108 sends a SIP REGISTER message to the default registrar. Referring back to FIG. 1, the default registrar for the first network phone 102 may be the first proxy server 120, while the second network phone 108 may register with the second proxy server 124. When a call arrives at the proxy server for any of the registered SIP URIs, the proxy server will forward the call to the appropriate destination. If a network phone is moved to a new location, all calls to the associated SIP URI will still be properly routed to that device. In other words, the system 100 provides device mobility in the sense that calls will "follow" the network phone according to its SIP URI. This is especially useful if the network phone 102 or 108 is running the DHCP (Dynamic Host Configuration Protocol) so that when the location is changed, the IP address is also automatically changed.

An advantage of the system 100 is that once the call is established between two or more network phones, the first access network 104, the access network 110, and/or the data network 114 provide data connectivity for up to a plurality of data communications channels. For example, the network phones 102 and 108 may be operable to communicate voice signals as voice-over-data packets on a voice-over-data channel. The network phones 102 and 108 may also be operable to communicate additional types of data, such as video data on one or more additional data channels. Voice-over-data functionality preferably conforms to a protocol for formatting voice signals as digital data streams. While any suitable protocol may be used, the media (voice signal) is preferably transported via the Real Time Protocol (RTP), inside User Datagram Protocol (UDP) packets. The Internet Protocol (IP) is also preferably used. RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

C. User Mobility Handling in a Network Telephony System

Figure 3:
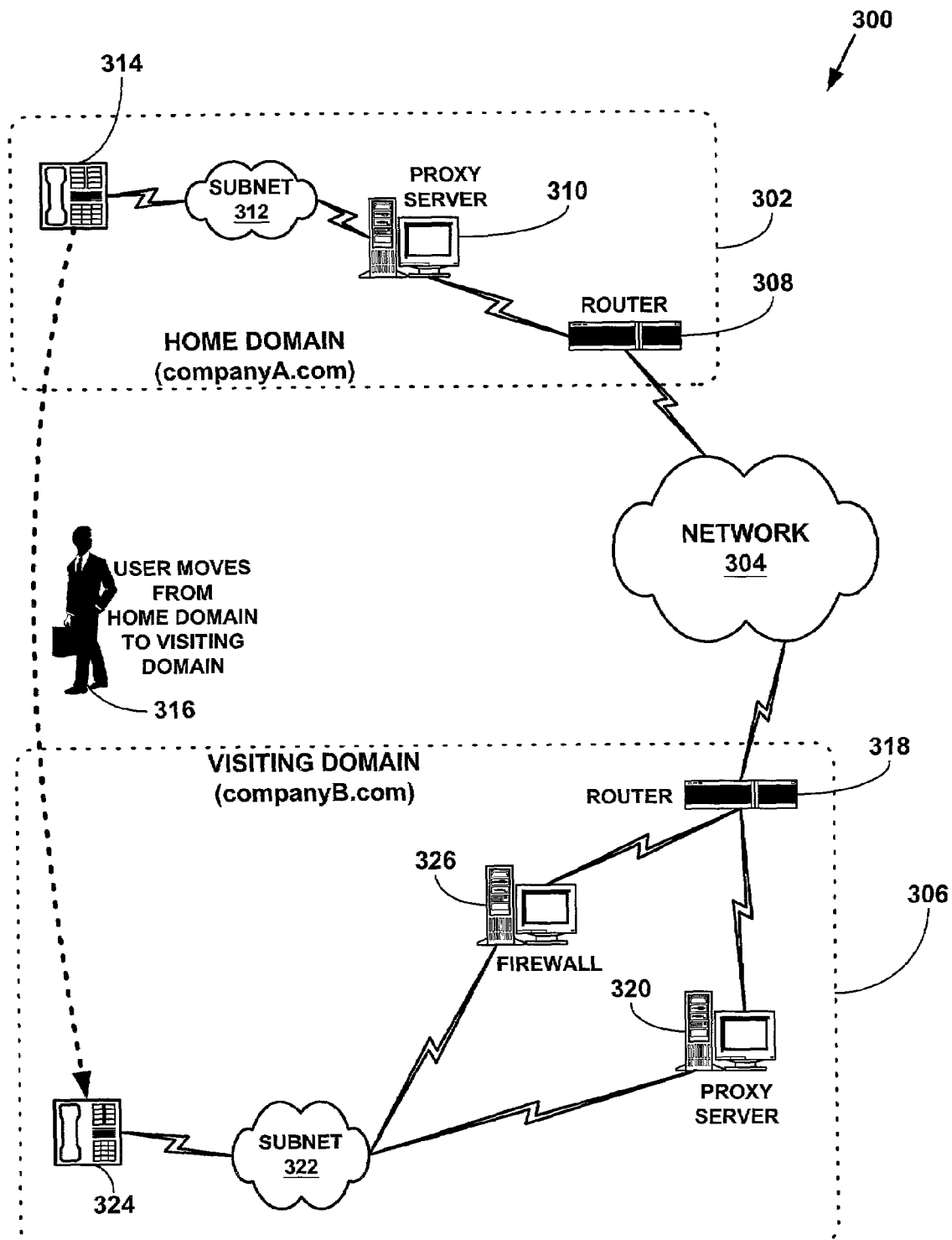
FIG. 3 is a simplified block diagram illustrating a network telephony system in which user mobility handling is employed according to an exemplary embodiment of the present invention.

FIG. 3 is a simplified block diagram illustrating a network telephony system 300, in which user mobility handling is employed, according to an exemplary embodiment of the present invention. The system 300 includes a first domain in the form of a home domain (companyA.com) 302, linked through a network 304 to a second domain 306. For the example to be described, the second domain 306 will be referred to as a visiting domain (companyB.com). Although only two domains are shown in the system 300, other numbers of domains may also be present and such variations are intended to be within the scope of the present invention.

The home domain 302 is shown to include a router 308 to link the home domain 302 to the network 304. A proxy server 310 is linked to the router 308, and provides all or some of the proxying functions described above. A subnet 312 is connected to the proxy server 310. A network entity 314 may communicate with the proxy server 310 through the subnet 312. Although the network entity 314 is pictured as a conventional network phone, other implementations may also be used. For example, the network entity 314 may simply be a wireless base station through which users roaming around the home domain 302 may access network functions via wireless devices, such as a mobile SIP phone. Although only one network entity 314 is shown, the home domain 302 is likely to contain many such network entities, and may additionally contain multiple subnets, proxy servers, and/or routers. Other equipment may also be included within the home domain 302 without departing from the intended scope of the present invention.

The network 304 is preferably an IP network. For example, the network 304 may be an internet, such as the public Internet.

The visiting domain 306 is shown to include a router 318, a proxy server 320, a subnet 322, and a network entity 324. In addition, the visiting domain 306 is also shown to include a firewall 326. The implementation of visiting domain 306 is exemplary only, and more or fewer devices may be included within the domain 306, as may additional subnets.

In the example of FIG. 3, a user 316 is associated with the home domain 302. For example, the user 316 may be an employee of a company that owns the home domain 302. For exemplary purposes, we have referred to the home domain 302 as "companyA.com." Thus, the user 316 may have a user identifier that is of the form user@companyA.com. As a result, the user 316 may be able to move throughout the home domain 302 while maintaining the user@companyA.com user identifier. The user identifier may, for example, be a SIP URI as was discussed above. The user 316 may utilize various network phones, mobile phones, or other devices that support a signaling protocol in use by the home domain 302. For example, the user 316 may have a Voice-over-IP (VoIP) mobile phone with SIP capabilities.

Suppose that the user 316 wishes to move from the home domain 302 to the visiting domain 306, as is shown in FIG. 3. Most existing signaling protocols do not facilitate the user 316 being able to use his VoIP SIP mobile phone in the visiting domain 306 while maintaining the user identifier associated with the home domain 302. As a result, the user 316 may experience difficulties when trying to make or receive calls from the visiting domain 306 (companyB.com). The next two paragraphs illustrate possible difficulties the user 316 may encounter when trying to use the user@companyA.com domain while in the visiting domain 306. In particular, it will be assumed that the user 316 wishes to use the network entity 324 to make or receive calls from the visiting domain 306. For example, the network entity 324 may be a wireless base station that the user 316 may use to place calls from the user's VoIP SIP phone.

In a first scenario, the companyB proxy server 320 is assumed to be a non-forwarding proxy server. The user 316 sends a REGISTER request to the companyB proxy server 320. The Request-URI of the REGISTER request contains the address of the companyA proxy server 310, and the To field of the REGISTER request contains user@companyA.com. The Contact field of the REGISTER request contains user@currentIPaddress, where "currentIPaddress" is an IP address associated with the location of the user 316 in companyB. In the example described herein, "currentIPaddress" refers to the IP address of the network entity 324. (Other types of addresses may also be used.) Because the companyB proxy server 320 is a non-forwarding proxy server, it drops the REGISTER request. As a result, the user 316 is not able to make or receive calls from the companyB domain 306 with the user@companyA user identifier.

In a second scenario, it will be assumed that the companyB proxy server 320 is a forwarding proxy server. Here again, the user 316 sends a REGISTER request to the companyB proxy server 320. This REGISTER request is identical to the request described in the first scenario. However, unlike the first scenario, upon receiving the REGISTER request, the companyB proxy server 320 forwards the request to the companyA proxy server 310 through the companyB router 318, the network 304, and the companyA router 308. Upon receiving the forwarded REGISTER request, the companyA proxy server 310 updates its registration information for the user 316. As a result, when a call comes for the user 316 to the companyA proxy server 310, the companyA proxy server forwards the incoming call request to user@currentIPaddress. Because the user 316 is now behind the firewall 326 in the companyB domain 306, the incoming call request does not reach the user 316. The companyA proxy server 310 cannot make direct contact with the user@currentIPaddress, the temporary user identifier for the user 316. The incoming call request does not go through the companyB proxy server 320 because the request includes the IP address of the network entity 324, rather than the companyB proxy server 320.

An embodiment of the present invention will now be illustrated using the exemplary network system set forth in FIG. 3. According to this embodiment, the companyB proxy server 320 is modified to provide user mobility handling. It will be assumed that the companyB proxy server 320 is a forwarding proxy server. The user 316 first sends a REGISTER request to the companyB proxy server 320. (This may include sending a request to a multicast address, as was described above with reference to FIG. 2.) In the REGISTER request, the Request-URI contains the address of the companyA proxy server 310, the To field contains user@companyA.com, and the Contact field contains user@currentIPaddress.

Upon receiving the REGISTER request, the companyB proxy server 320 determines that the user 316 is a foreign domain user, such as by performing a look-up operation on a database of companyB domain users (e.g., a registration database). Other techniques may also be used. The companyB proxy server 320 then assigns a new username for the user 316. The new username is preferably user_companyA, but other naming conventions may also be used. The companyB proxy server 320 adds the new username (user_companyA) to its registration database or communicates with a registration server to do the same. Before forwarding the REGISTER request to the companyA proxy server 310, the companyB proxy server 320 first modifies the Contact field in the REGISTER message to be user_companyA@companyB.com. (If a different naming convention is used, then the modification to the REGISTER message will correspond to the particular naming convention.) The companyB proxy server 320 sends the modified REGISTER message to the companyA proxy server 310 through the network 304. It should be noted that the To field in the modified REGISTER message is not modified, and thus the user 316 is able to maintain the companyA user identifier (user@companyA.com).

Upon successful registration with the companyA proxy server 310, the companyA proxy server 310 transmits a confirmation message to the companyB proxy server 320. On successful receipt of the confirmation message from the companyA proxy server 310, the companyB proxy server 320 keeps the record corresponding to the user 316 in its registration database. If no confirmation message is received, the companyB proxy server 320 may cause the record to be deleted. Receipt of a successful confirmation message ensures that the user 316 is essentially authenticated by the companyA proxy server 310. Thus, nobody else is able to spoof as user@companyA.com. The companyB domain has no efficient method to authenticate the user 316, and hence this mechanism helps in establishing the credentials of the user 316.

As a result of this modification to the companyB proxy server 320, the user 316 is able to make and receive calls while in the companyB domain 306, using the companyA user identifier (user@companyA.com). When an incoming call request is received for the user 316 at the companyA proxy server 310, the companyA proxy server 310 forwards the incoming call request to user_companyA@companyB.com, since the companyA proxy server has the updated registration information for the user 316. Because the call request is forwarded to a companyB user identifier (user_companyA@companyB.com), the incoming call request goes through the companyB proxy server 320 rather than through the firewall 326. The companyB proxy server 320 accesses its registration information for the user 316 to determine that the user 316 is now associated with the network entity 324. The companyB proxy server 320 forwards the incoming call request to user@currentIPaddress.

For the embodiment described above, it was assumed that the companyA proxy server 310 was able to communicate with the companyB proxy server 320 and vice versa. In some implementations, this may not be possible. In such a case, one or more intermediate clearinghouse proxies may be used. This concept is similar to the user of VLR/HLR (Visitors' Location Register/Home Location Register) in a mobile telephone network.

The embodiments described above were illustrated through the use of a particular network configuration, in which specific devices were set forth. Other configurations, however, may also be utilized in embodiments of the present invention. For example, the companyB domain 306 need not have a firewall 326. A firewall is included in the example merely to illustrate shortcomings of other solutions.

Figure 4:
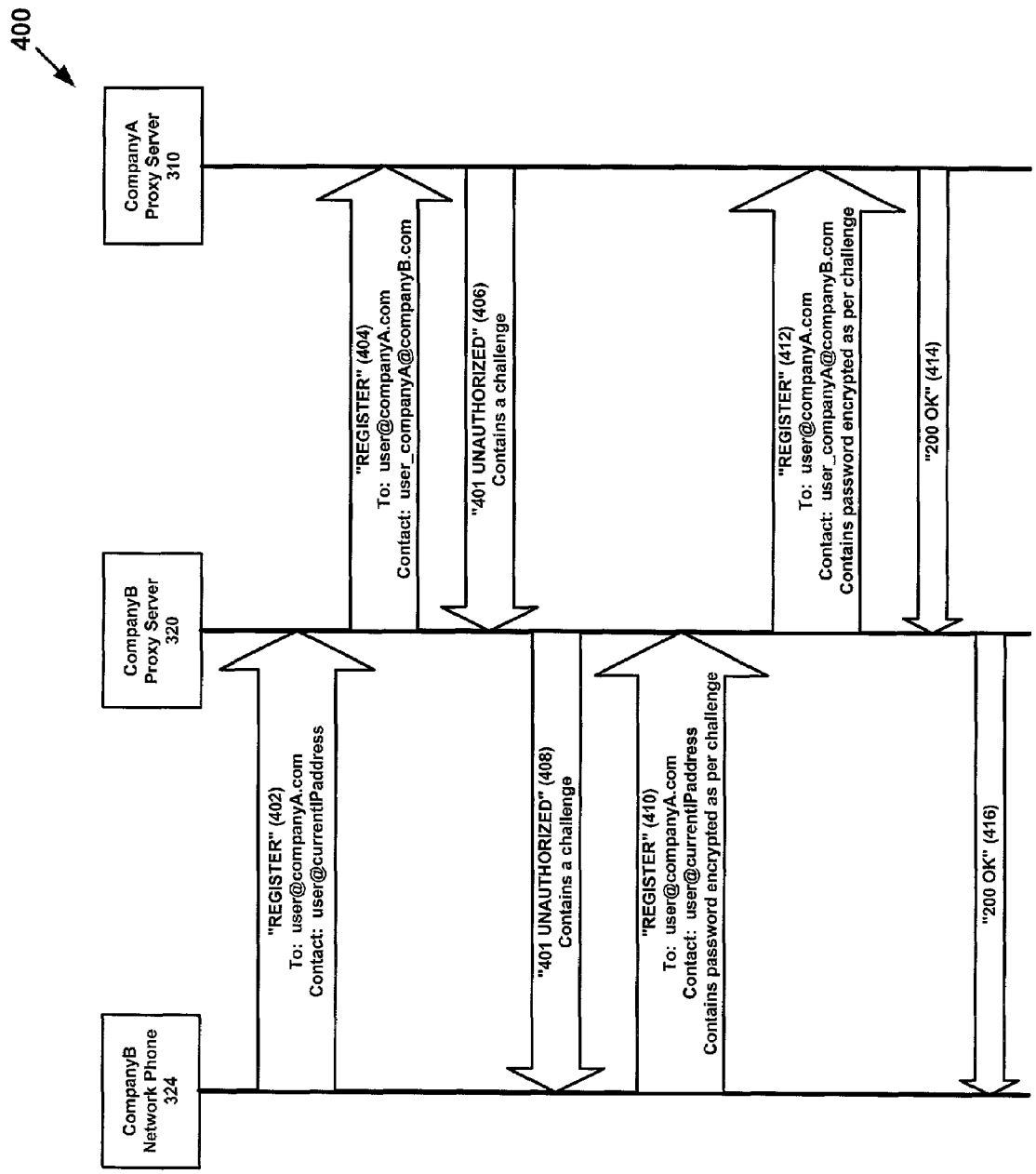
FIG. 4 is a message flow diagram illustrating a sequence of messages in a network telephony system having user mobility capabilities, according to an exemplary embodiment of the present invention.

FIG. 4 is a message flow diagram illustrating a sequence 400 of messages in a network telephony system having user mobility capabilities, according to an exemplary embodiment of the present invention. The exemplary sequence 400 is illustrated in terms of the SIP signaling protocol. Other signaling protocols may also be used. Although various network entities from the system 300 are used to illustrate the sequence 400, other network entities may additionally or alternatively be included.

The companyB network entity 324 transmits a REGISTER message 402 to the companyB proxy server 320. The "To" field is user@companyA.com and the Contact field is user@currentIPaddress.

The companyB proxy server 320 receives the REGISTER message 402 from the companyB network entity 324. The companyB proxy server 320 identifies the REGISTER request 402 as originating from an unregistered user. This determination may be made, for example, by consulting a registration database. The companyB proxy server 320 assigns a temporary username to the user 316. The temporary username is preferably user_companyA@companyB.com, although other naming conventions may also be used. The companyB proxy server 320 modifies the REGISTER request 402 so that the CONTACT field is changed to user_companyA@companyB.com. The companyB proxy server 320 transmits the modified REGISTER message 404 to the companyA proxy server 310. The To field of the REGISTER message 404 is unchanged from that of the REGISTER message 402.

Upon receiving the modified REGISTER message 404 from the companyB proxy server 320, the companyA proxy server 310 determines that the REGISTER message 404 is from an entity outside of the companyA domain. As a result, the companyA proxy server 310 transmits a "401 UNAUTHORIZED" message 406 to the companyB proxy server 320. The "401 UNAUTHORIZED" message 406 contains a challenge, such as an encrypted token or hashing token. The companyB proxy server 320 receives the "401 UNAUTHORIZED" message 406. The companyB proxy server 320 then forwards the "401 UNAUTHORIZED" message 408 to the companyB network entity 324.

Upon receiving the "401 UNAUTHORIZED" message 408 from the companyB proxy server 320, the user 316, or the user's SIP client, (through the companyB network entity 324) responds to the challenge from the companyA proxy server 310. For example, the user 316 may use the HTTP (Hyper Text Transfer Protocol) Digest Algorithm to generate a hash value. The companyB network entity 324 then transmits a REGISTER message 410 that includes the response to the challenge. For example, the REGISTER message 410 may include a password encrypted as per the challenge issued by the companyA proxy server 310. The companyB proxy server 320 forwards the REGISTER message 410 to the companyA proxy server 310 as REGISTER message 412, in which the Contact field is changed to user_companyA@companyB.com. This REGISTER message 412 also contains the response to the challenge.

Upon receiving the REGISTER message 412 from the companyB proxy server 320, the companyA proxy server 310 determines whether the response to the challenge is correct. This may include accessing a registration database, for example. If the companyA proxy server 310 determines that the response to the challenge is an appropriate response, then the companyA proxy server 310 transmits a "200 OK" confirmation message 414 to the companyB proxy server 320. The companyB proxy server 320 receives the "200 OK" message 414, and forwards it on to the companyB network entity 324 as "200 OK" message 416. If a "200 OK" message 414 is not received by the companyB proxy server 320 from the companyA proxy server 310, then the companyB proxy server 320 assumes that the user 316 is not an authorized companyA user, and deletes the appropriate information (user_companyA@companyB.com) from its registration database.

As a result of the sequence 400, the user 316 may receive or place calls from an entity within the companyB domain without changing the user identifier. Thus, user mobility is enabled.

Although the sequence 400 was described with reference to a SIP-based IP telephony system, other signaling and networking protocols may also be used. Similarly, although proxy servers and network phones were used to illustrate network elements, other types of network elements may also be used. If the MGCP signaling protocol is used, a Media Gateway Controller (MGC) may implement various user mobility functions according to embodiments of the present invention. If MEGACO is used, a decomposed media gateway may implement various user mobility functions according to embodiments of the present invention. The exemplary sequence 400 is not intended to limit the scope of various embodiments of the present invention.

D. Method for Providing a User Mobility in a Network Telephony System

FIG. 5 is a flow diagram illustrating a method 500 for providing user mobility handling in a network telephony system. In step 502, a proxy server on a first domain receives a REGISTER request from a network on the first domain. In step 504, the proxy server modifies the REGISTER request to include a modified user identifier. In step 506, the proxy server updates a registration database associated with the first domain, so that the modified user identifier is included within the registration database. In step 508, the proxy server transmits the modified REGISTER request via a network, such as the Internet, to a network entity on a second domain. The network entity on the second domain may, for example, be a proxy server located on the second domain. Other types of network entities, such as a registration server, may also serve as the recipient. In step 510, the proxy server receives a confirmation via the network from the network entity on the second domain.

FIG. 6 is a flow diagram illustrating a method 600 for providing user mobility handling according to another embodiment of the present invention. In step 602, a proxy server on a first domain receives a REGISTER request from a network entity on the first domain. In step 604, the proxy server modifies the REGISTER request to include a modified user identifier. In step 606, the proxy server updates a registration database associated with the first domain. In step 608, the proxy server transmits the modified REGISTER request via a network to a network entity on a second domain. In step 610, the proxy server receives a challenge via the network from the network entity on the second domain. In step 612, the proxy server transmits the challenge to the network entity on the first domain. In step 614, the proxy server receives a challenge response from the network entity on the first domain. In step 616, the proxy server transmits the challenge response via the network to the network entity on the second domain. If the challenge response is appropriate, the proxy server will receive a confirmation. In step 618, the proxy server determines whether the challenge response is successful, such as by determining whether a confirmation message has been received from the network entity in the first domain. If the challenge response is successful, then the user maintains registration with the proxy server on the first domain, and is able to make and receive calls using a user identity from the second domain. If the challenge response is not successful, then the proxy server updates a registration database associated with the first domain so that the registration database does not include the modified user identifier.

Preferred and alternative embodiments of the present invention have been illustrated and described. It will be understood, however, that changes and modifications may be made to the invention without deviating from its true spirit and scope, as defined by the following claims.

We claim:

1. A method for providing user mobility handling in a network telephony system, comprising in combination:
    receiving a register request from a network entity on a first domain, wherein the register request includes a user identifier, and wherein the user identifier is associated with a second domain;
    modifying the register request to form a modified register request, wherein the modified register request includes a modified user identifier, and wherein the modified user identifier is associated with the first domain;
    updating a registration database associated with the first domain to include the modified user identifier;
    transmitting the modified register request via a network to a network telephony server on the second domain;
    receiving a register response via the network from the network telephony server on the second domain, wherein the register response includes a challenge;
    transmitting the register response to the network entity on the first domain;
    receiving a challenge response from the network entity on the first domain;
    transmitting the challenge response via the network to the network telephony server on the second domain; and
    determining whether a confirmation is received from the network telephony server on the second domain.

2. A computer readable medium containing instructions to cause a processor to assist in carrying out the method of claim 1.

3. The method of claim 1, further comprising deleting the modified user identifier from the registration database, upon determining that the confirmation is not received.

4. The method of claim 1, wherein the network telephony server updates a registration database associated with the second domain to include the modified user identifier.

5. The method of claim 1, wherein the register request, the modified register request, and the challenge response are Session Initiation Protocol (SIP) register requests, wherein the register response is a SIP 401 Unauthorized message, and wherein the confirmation is a SIP 200 OK message.

6. The method of claim 1, wherein the network entity on the first domain is selected from the group consisting of a network phone, a wireless base station, and a computer.

7. The method of claim 1, wherein the user identifier and the modified user identifier are Universal Resource Indicators according to the Session Initiation Protocol.

8. The method of claim 1, wherein the registration database is maintained by a registration server, and wherein updating the registration database includes instructing the registration server to modify the registration database.

9. The method of claim 1, wherein the data network is the Internet.

10. The method of claim 1, wherein the network telephony server on the second domain is selected from the group consisting of a registration server and a proxy server.

11. The method of claim 1, wherein transmitting the modified register request includes transmitting the modified register request to an intermediate clearinghouse proxy server.

12. The method of claim 1, wherein the challenge and the challenge response compose an authentication process.

13. The method of claim 1, wherein the challenge response includes a password encrypted according to the challenge.

14. A method for providing user mobility handling at a first network telephony server, wherein the first network telephony server is operable to implement at least a portion of the Session Initiation Protocol, comprising in combination:
    receiving a register request from a network entity on a first domain, wherein the register request includes a user identifier in a To field and an address associated with the network entity in a Contact field, and wherein the user identifier is associated with a second domain;
    modifying the register request to form a modified register request so that the Contact field includes a modified user identifier, wherein the modified user identifier is associated with the first domain;
    updating a registration database to include the modified user identifier;
    transmitting the modified register request via a network to a second network telephony server on the second domain;
    receiving an unauthorized response via the network from the second network telephony server, wherein the unauthorized response includes a challenge;
    transmitting the unauthorized response to the network entity;
    receiving a register response from the network entity, wherein the register response includes the user identifier in a To field and the address associated with the network entity in a Contact field, and wherein the register response includes a challenge response;
    modifying the register response to form a modified register response so that the Contact field includes the modified user identifier;
    transmitting the modified register response via the network to the second network telephony server;

determining whether a confirmation is received from the second network telephony server; and deleting the modified user identifier from the registration database in response to determining that the confirmation is not received.

15. A computer readable medium containing instructions to cause a processor to assist in carrying out the method of claim 14.

16. The method of claim 14, wherein the first network telephony server is a proxy server.

17. The method of claim 15, wherein the network entity is selected from the group consisting of a network phone, a wireless base station, and a computer.

18. The method of claim 14, wherein the address associated with the network entity includes a username associated with a user of the network entity and a network address of the network entity, wherein the user identifier is a Universal Resource Indicator including the username and a domain address of the second domain, and wherein the modified user identifier includes the username, at least a portion of the domain address of the second domain, and a domain address of the first domain.

* * * * *